UNITED STATES PATENT OFFICE.

ERNST MENNE, OF CREUZTHAL, GERMANY.

METHOD OF HEATING ORES IN TWO CHAMBERS OR RETORTS ARRANGED BEHIND EACH OTHER.

1,114,502.  Specification of Letters Patent.  Patented Oct. 20, 1914.

No Drawing.  Application filed July 1, 1912. Serial No. 707,069.

*To all whom it may concern:*

Be it known that I, ERNST MENNE, doctor of philosophy, chemist, a subject of the German Emperor, and resident of Creuzthal, Westphalia, Germany, have invented a new and useful Method of Heating Ores in Two Chambers or Retorts Arranged Behind Each Other, of which the following is a specification.

The present invention relates to a novel method of heating ores, especially manganese ores, for recovering valuable by-products, such as carbonic acid, oxygen, and the like. Hitherto the ores were heated in retorts in which the temperature was raised to the degree required for generating such gases, but with this method there was the drawback that the plant would wear very rapidly, and especially so when rotary retorts were employed for obtaining the profitable by-products. Such wear could not be ascribed to the destructive power of the gases acting on the walls of the retorts, but on the contrary it appears as if the water vapors which were generated during the first part of the heating process had a destructive effect on the metallic parts. For avoiding this trouble and not allowing the gas to be mixed with other gases, such as hydrogen which would be partly burned in the oxygen and thereby reduce the output, the method according to the present invention is carried out in such a manner that the ores to be heated are treated in two independent retorts in succession. In carrying out this process, the first retort is not heated to as high a temperature as the second; so that the product to be recovered is not produced in any considerable quantity. The first retort, or the like, need not be absolutely closed, and the charge may be allowed to fall by any suitable means affording no access of air from the first into the second retort. In the second retort, the ore is subjected to the temperature required for driving off the remaining gas, as will be understood. As the second retort may be made shorter than a single retort for the entire process, the danger of the retort sagging and bending is overcome and the manner of driving it is more simple.

It is known in principle to treat ores in two chambers successively, but such methods refer to the chloridizing and calcining processes, whereas the treatment in two separate retorts according to the present invention has the object of heating the ores in stages for the purpose of producing oxygen and carbonic acid in recoverable quantities.

I claim:—

1. The method of heating ores, for the recovery of gaseous by-products therefrom, consisting in preliminarily heating the ore, at a moderate temperature, collecting the vapors and gases evolved, transferring the ore without access of air, and heating at a higher temperature, separately collecting the gases evolved at this higher temperature, the products of combustion being excluded from contact with the ore and from the gases evolved therefrom during both of the heating periods.

2. The method of heating manganese ores, for the recovery of oxygen and carbon dioxid therefrom, consisting in preliminarily heating the ore, at a moderate temperature, collecting the vapors and gases evolved, transferring the ore without access of air, and heating at a higher temperature, separately collecting the gases evolved at this higher temperature, the products of combustion being excluded from contact with the ore and from the gases evolved therefrom during both the heating periods.

In testimony, that I claim the foregoing as my invention, I have signed my name in presence of two witnesses, this 19th day of June 1912.

ERNST MENNE.

Witnesses:
 LOUIS VANDORN,
 BESSIE F. DUNLAP.

Copies of this patent may be obtained for five cents each, by addressing the "Commissioner of Patents, Washington, D. C."